United States Patent Office 3,776,964
Patented Dec. 4, 1973

3,776,964
ORGANOLITHIUM POLYMERIZATION
INITIATORS
Robert C. Morrison and Conrad W. Kamienski, Gastonia, N.C., assignors to First National City Bank, New York, N.Y.
No Drawing. Filed Mar. 18, 1971. Ser. No. 125,793
Int. Cl. C07f 1/02
U.S. Cl. 260—665 R    24 Claims

ABSTRACT OF THE DISCLOSURE

Polymerization initiators comprising alkyllithium adduct-metalates of conjugated dienes and vinyl-substituted aromatic compounds. Such initiator compositions are highly effective for the production of polymers of conjugated dienes and/or vinyl-substituted aromatic compounds.

---

This invention relates to the preparation of novel polymerization initiators and to the use thereof for the production of polymers of conjugated dienes and/or vinyl-substituted aromatic compounds. The novel initiators of the present invention are derived from $C_2$-$C_{12}$ alkyllithiums and polymerizable conjugated dienes and/or polymerizable vinyl-substituted aromatic compounds, especially polymerizable vinyl-substituted aromatic compounds, which are reacted in a manner described hereafter in detail.

It has heretofore been known, as shown in U.S. Pat. No. 3,377,404, to prepare alkyllithium initiators, for use in the polymerization of conjugated dienes and vinyl-substituted aromatic compounds, by a procedure comprising initially preparing an organo polylithium polymerization initiator in a polar solvent, such as diethyl ether, then solubilizing said initiator by reacting the same with a small amount of a conjugated diene, then replacing a substantial portion of the polar solvent with a hydrocarbon diluent, and thereafter contacting the solubilized organo polylithium initiator with a conjugated diene in the hydrocarbon diluent substantially reduced in polar solvent content to effect polymerization of said conjugated diene. The objective is to make conjugated diene polymers or copolymers of conjugated dienes with vinyl-substituted aromatic compounds with low viscosities and with narrow molecular weight distribution. A particular advantage of using said known initiators is that the usual initiation step in polymerization is avoided, propagation proceeding directly to produce largely monodisperse polymers. These initiators, in the form of adducts, can be prepared in a hydrocarbon medium in the presence or absence of aliphatic or cycloaliphatic ethers. In the absence of ethers, the adducts, as heretofore prepared, possess a relatively high molecular weight and are soluble in the medium only in relatively low concentration. On the other hand, when prepared in the presence of said ethers, the adducts, when used as catalysts for the polymerization of 1,3-conjugated dienes, do not produce the desired high 1,4-polymer microstructure. Thus, addition of alkyllithium compounds to, for example, doubly-substituted vinyl-aromatic compounds, as heretofore carried out, produces only higher molecular weight polymers or necessitates the presence of undesirable ethers to produce adducts of reasonably low molecular weight and high solubility.

In our copending application, Ser. No. 4,126, filed Jan. 19, 1970, now Pat. No. 3,668,163, issued June 6, 1972, we have disclosed novel initiators in the form of alkyllithium adducts of conjugated dienes and vinyl-substituted aromatic compound monomers. As there disclosed, the initiators of our said copending application are of extremely low molecular weight and can be prepared by the gradual and controlled addition of a polymerizable conjugated diene monomer or of a vinyl-substituted aromatic compound to a liquid hydrocarbon medium containing a $C_2$-$C_{12}$ alkyllithium and varying amounts of an aliphatic tertiary amine activator, adducts of exceptionally high molarity, based on the lithium, being realized by keeping polymerization of the diene and/or vinyl-substituted aromatic compound at a low value or a practical minimum, the monomeric character of the monomer portion of the initiators being most desirously maintained although dimerization of the monomer may be present to a greater or lesser extent. Essentially all of the alkyllithium employed is used up in the production of the initiator so that there is no or essentially no free alkyllithium present. Polymerization proper of the monomer is avoided in the production of said initiators, dimerization not being considered to be included within the meaning of the term "polymerization." The said initiators are disclosed to be useful as difunctional initiators of the polymerization of conjugated dienes and vinyl-substituted aromatic compounds.

The initiators of our aforesaid copending application are, fundamentally, difunctional adducts but, in their preparation, minor amounts of polyfunctional adducts, resulting from side reactions, are present. These polyfunctional adducts are formed by reason of competitive addition of product difunctional adduct to some incompletely reacted monofunctional adduct, as may be illustrated by the following indicated reactions, using as the reactants meta-divinylbenzene and sec-butyllithium as reactants in the presence of triethylamine:

(A) Main Reaction:

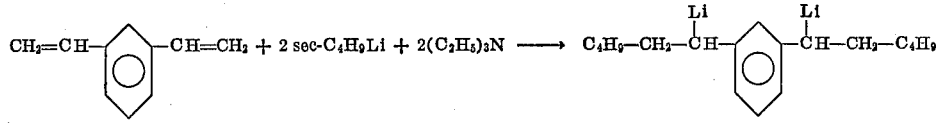

Ideal Difunctional Product (B) Competitive Side Reaction:

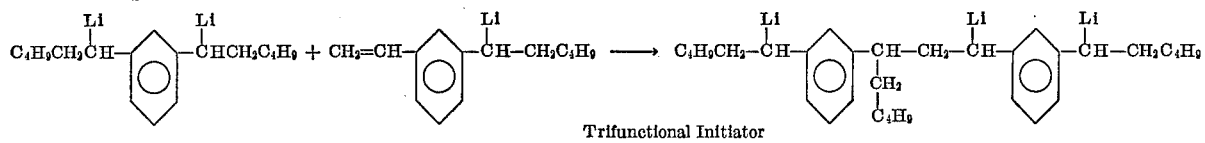

Trifunctional Initiator

Although such polyfunctional impurities are also useful initiators of polymerization in themselves, their presence in the mixture in varying amounts does not allow an accurate assessment of difunctional and polyfunctional components in the catalysts, thus making similar assessments difficult in the resultant "living" polymers. Such an assessment is important in certain situations as, for instance, when these "living" polymers are derivatized by reaction with "capping" agents such as ethylene oxide and the resultant hydroxy-terminated polymers reacted with di- and polyisocyanates to produce a urethane network useful for liquid rubber molding or encapsulating technology. An accurate knowledge of the number of functional groupings per polymer chain in such hydroxy-terminated polymers is required to known how much isocyanate to add in order to obtain maximum cross-linking or network formation in the final polymer.

It is, accordingly, an object of this invention to provide novel polymerization initiator compositions wherein equal numbers of active sites are present in each initiator molecule.

Another object of this invention is to provide novel metalated lithium adducts of conjugated dienes or vinyl-substituted aromatic compounds which are soluble in relatively high molar concentration in a hydrocarbon medium free of aliphatic or cycloaliphatic ethers.

Another object of this invention is to provide novel di- and polyfunctional alkyllithium compounds.

Still another object is to provide a process for preparing conjugated diene and vinyl-substituted aromatic polymers and copolymers utilizing the initiators of the present invention.

Further objects, advantages and features of our invention will be apparent from the following disclosures.

We have now found that the initiator compositions made pursuant to our aforementioned copending patent application, which, as stated, comprise mono- and di-adducts of high molarity in which polymerization of the conjugated dienes or vinyl-substituted aromatic compounds is essentially completely suppressed, particularly the mono-adducts, can be metalated with a $C_2$-$C_{12}$ alkyllithium compound, in the presence of an aliphatic tertiary amine activator, at activated carbon atoms in the molecule such as methyl, or substituted methyl, carbon atoms in an alpha position to aromatic groups, or to other unsaturated groups such as vinyl or substituted vinyl groups. Thus, for example, addition of sec-butyllithium to meta-vinyltoluene in the presence of an equivalent of triethylamine at 0° leads predominately to the adduct, meta-(1-lithio-3-methylpentyl) toluene, as shown below:

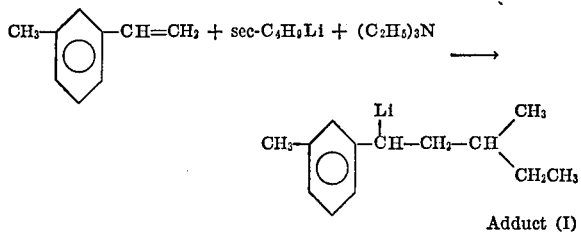

Adduct (I)

The adduct (I) above, in turn, is readily converted to a dilithio compound by metalation with another equivalent of sec-butyllithium in the presence of a tertiary amine activator at ambient temperature, as shown by the following equation:

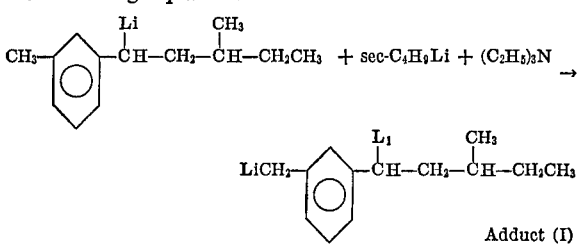

Adduct (I)

The adduct (I) can also readily be converted to a di- (or even a tri-) lithio compound by first reacting it with from one to several equivalents of a conjugated diene and then metalating the resulting oligomer with another equivalent of sec-butyllithium, as shown by the following equations:

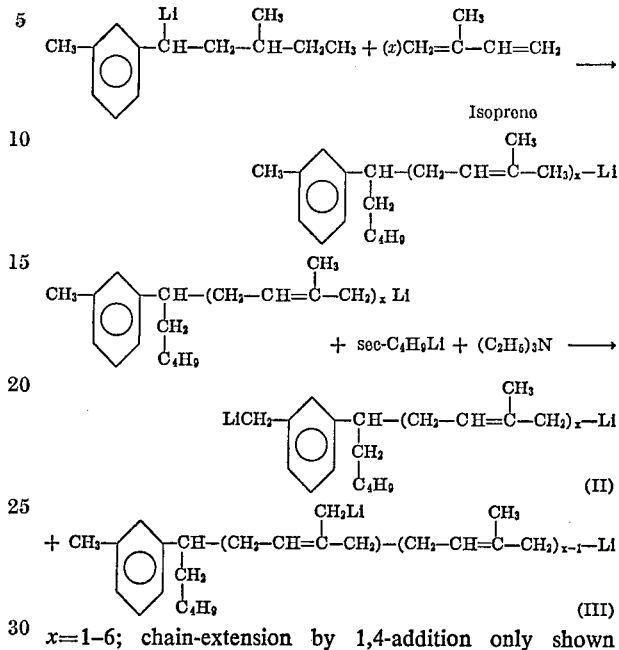

$x=1$-$6$; chain-extension by 1,4-addition only shown above; 3,4-addition also possible.

Reaction of II and/or III (above) with a third equivalent of sec-butyllithium (or more) results in further metalations at allylic or benzylic positions as shown below:

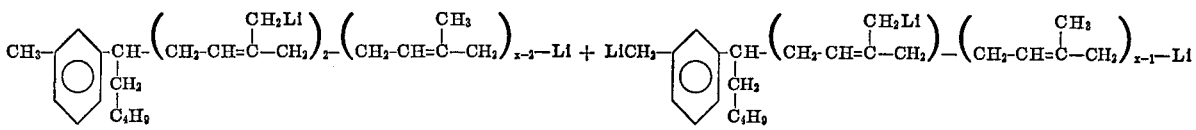

These sequential reactions have the advantage of generating initiator molecules, all of which possess essentially the same degree of functionality. Those sequential reactions involving chain-extension of mono-adduct before metalation have the added advantage of providing increased solubility in hydrocarbon solvents for both the resultant di-(or poly-)lithio compounds, themselves, and for the monomer-catalyst complexes which form when monomer and the di-(or poly-)lithio compounds are mixed together at the inception of polymerization reactions.

An exceptionally high incorporation efficiency of conjugated diene (illustratively isoprene) into adduct (I) is obtained at $-20°$, as can be seen in Table I.

TABLE I

Chain-extension of meta-(1-lithio-3-methylpentyl) toluene (Adduct I) with Isoprene Product distribution (GLC percent)

| Run number: | Isoprene-lithium ratio | Adduct I | Adduct I plus 1 isoprene | Adduct I plus 2 isoprene | Adduct I plus 3 isoprene | Higher oligomers |
| --- | --- | --- | --- | --- | --- | --- |
| A | 1.2 | 4.4 | 89.8 | 5.8 | 0 | 0 |
| B | 3.0 | 0 | 14.1 | 42.5 | 43.4 | N.d. |
| C | 6.1 | 0 | 0 | Trace | Trace | N.d. |

NOTE.—N.d.=Not detectable due to high boiling point of oligomers.

It will be noted that approximately 90% of the isoprene incorporated in Run A of Table I is present as the monoisoprene oligomer adduct of meta-(1 - lithio - 3 - methylpentyl) toluene (adduct I).

Even with three isoprene units incorporated per carbon-lithium present most of the isoprene is found in di-, tri- and (presumably) tetraisoprene oligomer adducts of meta - (1 - lithio - 3 - methylpentyl) toluene. Thus, polymerization of the diene is essentially completely suppressed in these chain-extension reactions.

Metalation of these isoprene oligomer adducts with an additional equivalent of sec-butyllithium in the presence of tertiary amine activator at ambient temperature is relatively rapid, being essentially complete within 6 to 7 hours.

Polymerizable conjugated dienes employed in the production of the initiators and the initial monolithioadducts of this invention, as well as in the subsequent chain extension of these adducts, are 1,3-conjugated dienes containing from 4 to 12, inclusive, carbon atoms per molecule. Examples thereof include the following: 1,3-butadiene; isoprene; 2,3 - dimethyl - 1,3 - butadiene; 1,3-pentadiene (piperylene); 2 - methyl - 3 - ethyl - 1,3 - butadine; 3 - methyl - 1,3 - pentadiene; 1,3 - hexadiene; 2-methyl - 1,3 - hexadiene; and 3 - butyl - 1,3 - octadiene. Among the dialkylbutadienes, it is preferred that the alkyl groups contain from 1 to 3 carbon atoms. Numerous others are disclosed, for instance, in U.S. Pat. No. 3,377,404, the disclosure with respect to which is incorporated herein by reference.

In addition to or in place of the above described conjugated dienes, polymerizable vinyl-substituted aromatic compounds can be combined with alkyllithium compounds to form the polymerization initiators. These compounds include styrene; alpha-methylstyrene; vinyltoluene; 1-vinylnaphthalene; 2-vinylnaphthalene; 1 - alpha - methylvinylnaphthalene; 2 - alpha - methylvinylnaphthalene; 1, 2 - diphenyl - 4 - methylhexene - 1; 1,6 - diphenyl-hexadiene - 1,5; 1,3 - divinylbenzene; 1,3,5 - trivinylbenzene; 1,3,5 - triisopropenylbenzene; 1,4 - divinyl-benzene; 1,3-distyrylbenzene; 1,4-distyrylbenzene; 1,2-distyrylbenzene; and mixtures of these, as well as alkyl, cycloalkyl, aryl, alkaryl and aralkyl derivatives thereof in which the total number of carbon atoms in the combined hydrocarbon constituents is generally not greater than 12. Examples of these latter compounds include: 3 - methylstyrene; 3,5-diethylstyrene; 2 - ethyl - 4 - benzylstyrene; 4 - phenylstyrene; 4 - p - tolylstyrene; 2,4 - divinyltoluene; 4,5-dimethyl - 1 - vinylnaphthalene; 2,4,6 - trivinyltoluene; and 2,4,6 - triisopropenyltoluene. Again, reference is made to U.S. Pat. No. 3,377,404 for disclosures of additional vinyl-substituted aromatic compounds which are incorporated herein by reference.

Especially satisfactory for the production of the initiators are meta-divinylbenzene and styrene.

In describing our invention, the polymerizable conjugated dienes and vinyl-substituted aromatic compounds are generically, and for simplicity, sometimes referred to as "monomers."

The alkyllithiums which are reacted or adducted with the monomers to produce initiators or adducts in accordance with the present invention are generally in the $C_2$–$C_{12}$ range and include, for example, ethyllithium, n-propyllithium, isopropyllithium, n - butyllithium, isobutyllithium, sec-butyllithium, tert-butyllithium, n-amyllithium, isoamyllithium, sec-amyllithium, and tert-amyllithium. Of especial utility are secondary and tertiary alkyllithiums such as isopropyllithium, sec-butyllithium, tert-butyllithium, sec-amyllithium and tert-amyllithium.

While, in the broader aspects of the present invention, the mole ratio of monomer to alkyllithium used in the production of the novel initiators or adducts may be varied from 1 to 100 of the monomer to 1 of the alkyllithium, and preferably from 1 to 10 of the monomer to 1 of the alkyllithium, a particularly important mole ratio range is from 1 to 2 of the monomer to 1 of the alkyllithium.

The aliphatic tertiary amine activators are generally low molecular weight trialkylamines possessing no methyl groups, as well as di-tertiary amines, and they include, by way of example, triethylamine, tri - n - propylamine, tri-isopropylamine, ethyl-di-n-propylamine, diethyl-n-butylamine, and triisobutylamine. Arylalkyl tertiary amines may also be used and, in such cases, methyl groups can be present, illustrative of which arylalkyl tertiary amines are dimethylaniline, diethylaniline, diisopropylaniline, and methylisobutylaniline. Especially satisfactory are tertiary monoamines such as triethylamine. The amount of tertiary amine employed in the preparation of the alkyllithium adducts and adductmetalates of this invention is variable and will usually fall within the range of about 0.01 to 10 equivalents per equivalent of alkyllithium utilized, and preferably from 0.2 to 2 equivalents per equivalent of alkyllithium when the solvent medium is a liquid hydrocarbon.

The hydrocarbon solvent media which may be, and, generally, advantageously are employed are normally liquid alkanes and cycloalkanes such as n-pentane, n-hexane, n-heptane and cyclohexane, and normally liquid aromatic hydrocarbons, such as benzene, toluene, xylene, ethylbenzene and pseudocumeme, as well as various mixtures of these types. The concentration range of the adducts in solution may be varied widely, with solutions containing between about 0.5 and 2 equivalents of adduct, per liter, based on lithium, being particularly desirable.

As described in our aforesaid copending application Ser. No. 4,126, the addition of alkyllithium compounds to conjugated dienes or vinyl-substituted aromatics can be controlled to give exclusively 1:1 adducts based on the alkyllithium and activated vinyl groups present. Thus, for example, addition of styrene to a solution of sec-butyllithium in hexane containing an equivalent of triethylamine at 0° C. results in the formation of 97 mole percent of 1-lithio-3-methylpentylbenzene:

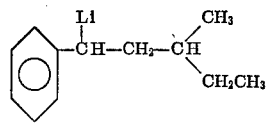

Examples of such adducts in addition to the above are 1-lithio - 5 - methylheptene - 2; 3-lithiomethyl-4-methylhexene-1; 1 - lithio - 3,5 - dimethylheptene-2; 3-lithiomethyl - 2,4 - dimethylhexene - 1; 3-(1-lithio-3-methylpentyl) toluene and 3,5-dimethyl (1-lithio - 3 - methylpentyl)benzene.

As mentioned previously, the next step after initial adduct formation in the preparation of the novel initiators of this invention may be chain extension with a 1,3-conjugated diene, examples of which are given above. The amounts of 1,3-conjugated diene used for this chain extension step may vary from 1 to 100 equivalents per carbon-lithium in the initial adduct. A preferred range, however, is from 1 to 10 equivalents of 1,3-conjugated diene per equivalent of carbon-lithium in the initial adduct. Within this preferred range, optimum quantities of diene employed will normally vary depending on the number of carbon-lithium bonds to be formed by metalation with additional alkyllithium compound after the chain-extension process. Thus, if a dilithio compound is to be formed, a preferred range is from 1 to 3 equivalents of conjugated diene; if a trilithio is to be formed, the preferred range is from 2 to 4 equivalents of conjugated diene, etc.

It is to be understood, however, that, in certain instances, no chain-extension with diene will be required. Thus, for example, a dilithium initiator may be formed from the adduct of 3-vinyl-toluene and sec-butyllithium by direct metalation of the ring methyl group with a second equivalent of sec-butyllithium in the presence of a tertiary amine activator, as shown below:

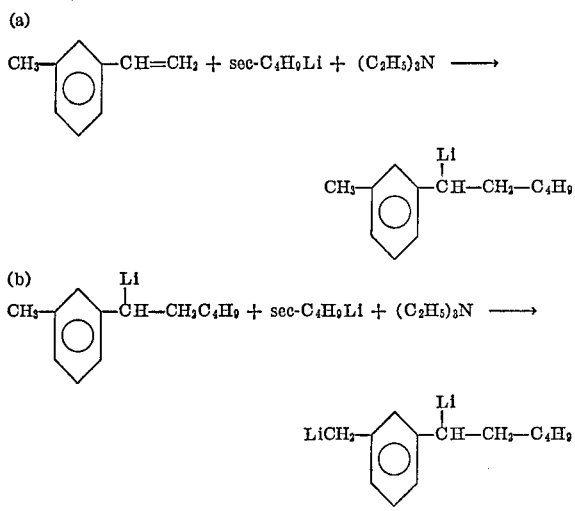

It is also within the scope of this invention to obtain tri-, tetra- and polylithio compounds by this means, without chain extension, by starting, for instance, with a di-, tri- or polymethylated styrene, in which case metalation of the initial adduct with more than one equivalent of sec-butyllithium or other alkyllithium will lead to the desired compound. Thus, starting with 3,5-dimethylstyrene and 3 equivalents of sec-butyllithium, one obtains 3,5-dilithiomethyl-(1-lithio-3-methylpentyl)benzene. All of the alkyllithium may be added initially, or that required for metalation may be added after initial adduct formation as described in Equation a above.

Optimum reaction temperatures for each of these steps, i.e., adduct formation, chain extension (if desired) and metalation are as follows: For adduct formation, the optimum reaction temperature range is from —25° to 10° C. For chain extension, the optimum temperature range is from —25° to 25° C. For metalation, the optimum temperature range is from +10° to +40° C. It is, for example, most preferable to carry out the adduction and chain extension reactions below 0°, then to warm the reaction mixture to ambient temperature and carry out the metalation reaction.

These adduct-metalates are novel organolithium compounds which possess a high solubility in hydrocarbon solvents and are useful as di- or polyfunctional initiators in various "anionic" polymerization reactions.

The monomers which can be polymerized in the presence of the initiators or alkyllithium adduct-metalates of our invention are polymerizable conjugated dienes containing from 4 to 12 carbon atoms, preferably 4 to 8 carbon atoms per molecule, and polymerizable vinyl-substituted aromatic compounds. Examples of these conjugated dienes are the same as those given in regard to the monomers used in the initiator preparation. In addition, the above conjugated dienes containing substituents along the chain can also be employed, such as, for example, halogenated and alkoxy-substituted conjugated dienes such as chloroprene; fluoroprene; 2-methoxyl-1,3-butadiene; 2-ethoxy-3-ethyl-1,3-butadiene, and the like. Of the conjugated dienes, the particularly preferred monomers are 1,3-butadiene, with isoprene and piperylene also being especially suitable. The conjugated dienes can be polymerized alone or in admixture with each other to form copolymers or by charging the dienes sequentially to form block copolymers. The vinyl-substituted aromatic compounds, which may be polymerized as such, or which can be copolymerized with the dienes, include those mentioned above, such as styrene, 1-vinylnaphthalene, 2-vinylnaphthalene, as well as the alkyl, cycloalkyl, aryl, alkaryl, aralkyl, alkoxy, aryloxy, and dialkylamino derivatives thereof in which the total number of carbon atoms in the combined substituents is generally not greater than 12, examples of such derivatives being 3-vinyltoluene; 4-phenylstyrene; 4 - cyclohexylstyrene; 4-p-tolylstyrene; 3,5-diphenylstyrene; 4-methoxystyrene; 4 - dimethylamino-styrene; 3,5-diethylaminostyrene; 3 - ethyl-1-vinyl-naphthalene; 6-cyclohexyl-1-vinyl-naphthalene; 6 - benzyl-2-vinylnaphthalene; 4-methoxy-1-vinylnaphthalene; 6-phenoxy-1-vinyl-naphthalene, and the like. The vinyl-substituted aromatic compounds can be copolymerized with the conjugated dienes to form random or block copolymers. Generally, the presence of dialkylanilines, diarylethers and alkylarylethers in limited amounts does not adversely affect the microstructure of the resulting polydiene polymers as does the presence of simple alkyl or cycloalkyl ethers such as diethyl ether or methyl cyclohexyl ether.

In one aspect of the practice of our invention, polar monomers can be employed to form block copolymers with the conjugated dienes. The polar monomer is charged after the conjugated diene has polymerized. Among the polar monomers applicable are, for instance, vinylpyridines and vinylquinolines in which the vinyl group is positioned on a ring carbon other than a beta carbon with respect to the nitrogen. These pyridine, quinoline and isoquinoline derivatives can carry substituents such as alkyl, cycloalkyl, aryl, alkaryl, aralkyl, alkoxy, aryloxy and dialkylamino groups, the total number of carbon atoms in the combined substituents being generally not greater than 12. Also, there should be no primary or secondary alkyl groups on ring carbons in the alpha and gamma positions with respect to the nitrogen. Examples of these heterocyclic-nitrogen polar monomers are 2-vinylpyridine; 4-vinylpyridine; 3,5-diethyl-4-vinylpyridine; 5-cyclohexyl-2-vinylpyridine; 3 - benzyl-4-vinylpyridine; 6-methoxy-2-vinylpyridine; 3,5 - dimethyl-4-dimethylamino-2-vinylpyridine; 2 - vinylquinoline; 1-vinylisoquinoline; 3 - methyl-4-ethoxy-2-vinylquinoline; 5-dimethylamino-3-vinylisoquinoline, and the like. Still other polar monomers which can be utilized include acrylic and alkacrylic acid esters, nitriles, and N,N-disubstituted amides, such as methyl acrylate, methyl methacrylate, butyl methacrylate, acrylonitrile, methacrylonitrile, N,N-dimethylacrylamide, N,N - diethylmethacrylamide, vinylfuran, N-vinylcarbazole and n-butylisocyanate.

Illustrative, non-limiting examples of the practice of our invention are set out below. Numerous other examples can readily be evolved in the light of the guiding principles and teachings contained herein. All temperatures recited are in degrees Centigrade. In said examples, triethylamine and benzene were purified by distillation from n-butyllithium prior to use. Vinyltoluene and styrene were distilled from di-butylmagnesium. Sec-butyllithium was used either as received in hexane solution or was used as a benzene solution by replacement of hexane with benzene. Commercial sources of the reactants can, of course, be utilized.

EXAMPLE 1

Preparation of 3-(1-lithio-3-methylpentyl)benzyllithium (a) Sec-butyllithium (44 ml. of a 1.16 N solution in benzene) and 5 g. of triethylamine are charged to a dry, argon-purged, 100 ml., three-necked reaction flask. The flask and contents are cooled to 0° and are maintained at that temperature throughout the addition reaction. 3-methylstyrene (3 g.) is diluted with 3 ml. of dry benzene in a small addition funnel and added dropwise over a period of 7 minutes to the rapidly stirred contents of the flask. At this point, the product solution is a bright, cherry red, clear solution. The solution is transferred to a 100 ml. screw-capped bottle, with the aid of 40 ml. of dry benzene, sealed with a septum, cap and tape. The bottle and its contents are allowed to stand at room temperature for 10 hours. At the end of this time, gas chromatographic analysis shows the product to be completely metalated. 90 ml. of a clear, deep red solution of 3-(1-lithio-3-methylpentyl) benzyllithium are obtained. The total alkalinity and the carbon-bound lithium content of the solution are found to be 0.56 N.

(b) A similar solution is prepared from commercially available vinyltoluene (2:1 mixture of meta and para-vinyltoluene).

EXAMPLE 2

The procedure in Example 1 is followed except that a solution of sec-butyllithium in hexane is used instead of a solution in benzene. Hexane is employed as solvent instead of benzene throughout. Again metalation is rapid (10 hrs.), but a red precipitate forms, which represents about half of the initial carbon-lithium content of the solution. Replacement of the hexane solvent by flash distillation under vacuum followed by redilution with benzene causes the precipitate to completely dissolve after a two-week period.

EXAMPLE 3

Preparation of a chain-extended adduct of vinyltoluene 44.5 ml. of 1.14 N sec-butyllithium in hexane (50.8 mmoles) and 16 ml. of triethylamine (114 mmoles) are charged to the reactor. The reactor and contents are cooled to −20°. 6 g. (50.8 mmoles) of vinyltoluene (commercial) diluted with 6 ml. of hexane is then charged to the addition funnel. The diluted vinyltoluene is added dropwise (0.5 ml./min.) to the contents of the flash which is vigorously stirred. While still maintaining the temperature at about −20°, the product solution is stirred for 50 minutes and then 6 ml. (60 mmoles) of isoprene diluted with 6 ml. of hexane is added dropwise over a period of 1 hour and 40 minutes. The now clear, pale orange solution is allowed to warm up. Stirring at room temperature is continued overnight. The product solution along with 44.5 ml. (50.8 mmoles) of sec-butyllithium solution is then transferred to a 250 ml. bottle sealed with septum, screw-cap and tape. After 24 hours at room temperature, gas chromatographic analysis shows that all of the sec-butyllithium has been consumed in the metalation reaction. The total alkalinity content of the clear solution is 0.88 N, the carbon-lithium bound content, 0.87 N.

EXAMPLE 4

Example 3 is repeated except that 10 ml. (100 mmoles) of isoprene is substituted for the vinyltoluene in the adduct formation step. After reaction with an additional 50 mmoles of sec-butyllithium is complete, the resulting clear, pale yellow solution of adduct-metalate is found to contain 0.9 equivalents of carbon-lithium content per liter of solution.

EXAMPLE 5

Example 3 is repeated except that styrene is used in place of vinyltoluene. A clear solution of dilithio adduct-metalate is obtained.

EXAMPLE 6

Example 3 is repeated except that 15 ml. of isoprene (150 mmoles) is used to chain-extend the initial adduct before metalation with sec-butyllithium. Again, a clear solution of the adduct-metalate is obtained.

EXAMPLE 7

Example 3 is repeated except that 30 ml. of isoprene (300 mmoles) is used to chain-extend the initial adduct.

We claim:

1. A process for preparing di- and polyfunctional polymerization initiator compositions which comprises reacting 1 mole of a $C_2-C_{12}$ alkyllithium with from 1 to 2 moles of at least one polymerizable monomer selected from the group of $C_4-C_{12}$ conjugated dienes and vinyl-substituted aromatic compounds containing ring-substituted methyl in a medium selected from at least one member of the group of aliphatic, cycloaliphatic, and aromatic hydrocarbons whereby initially to effect adduction formation of a monolithio adduct, then reacting said monolithio adduct with about 1 additional mole of a $C_2-C_{12}$ alkyllithium, said reactions being carried out in the presence of a mono- or di-tertiary amine activator selected from the group consisting of low molecular weight aliphatic trialkylamines possessing no methyl groups, and arylalkyl tertiary amines in which the alkyl groups contain from 1 to 4 carbon atoms, said activators being employed in amounts in the range of about 0.01 to 10 equivalents per equivalent of alkyllithium.

2. A process for preparing di- and poly-functional polymerization initiator compositions which comprise reacting 1 mole of a $C_2-C_{12}$ alkyllithium with 1 mole of at least one polymerizable monomer selected from the group of $C_4-C_{12}$ conjugated dienes and vinyl-substituted aromatic compounds containing ring-substituted methyl in a medium selected from at least one member of the group of aliphatic, cycloaliphatic, and aromatic hydrocarbons, and a mono- or di-tertiary amine activator selected from the group consisting of low molecular weight aliphatic trialkylamines possessing no methyl groups, and arylalkyl tertiary amines in which the alkyl groups contain from 1 to 4 carbon atoms, said activators being employed in amounts in the range of about 0.01 to 10 equivalents per equivalent of alkyllithium, whereby initially to effect adduct formation of a monolithio adduct, then reacting said monolithio adduct with from about 1 to 2 moles of at least one of the aforesaid polymerizable monomers to effect chain-extension of said monolithio adduct, and then metalating said chain-extended monolithio adduct with about 1 mole of a $C_2-C_{12}$ alkyllithium to effect formation of di- or poly-functional initiator compositions.

3. A process according to claim 1 wherein the alkyllithium is sec-butyllithium.

4. A process according to claim 3 wherein the monomer is selected from the group of 1,3-butadiene, methylstyrene in which the metal is ring-substituted, p-vinyltoluene and m-vinyltoluene.

5. A process according to claim 2 wherein the alkyllithium is sec-butyllithium.

6. A process according to claim 5 wherein the monomer is selected from the group of 1,3-butadiene, methylstyrene in which the methyl is ring-substituted, p-vinyltoluene and m-vinyltoluene.

7. In a process for preparing di- and poly-functional polymerization initiator compositions in which there is provided a mixture comprising from 1 to 2 moles of a $C_2-C_{12}$ alkyllithium in a liquid reaction medium selected from at least one member of the group of aliphatic, cycloaliphatic, and aromatic hydrocarbons, and a mono- or di-teriary amine activator selected from the group consisting of low molecular weight aliphatic trialkylamines possessing no methyl groups, and arylalkyl tertiary amines in which the alkyl groups contain from 1 to 4 carbon atoms, said activators being employed in amounts in the range of about 0.01 to 10 equivalents per equivalent of alkyllithium, and gradually admixing therewith from 1 to 6 moles of at least one polymerizable monomer selected from the group of conjugated dienes containing from 4 to 12 carbon atoms per molecule and vinyl-substituted aromatic compounds to form a chain-extended adduct wherein any polymerization of said monomer is held to a low value, the improvement which comprises metalating said chain-extended adduct with additional $C_2$–$C_{12}$ alkyllithium to effect formation of di- or poly-functional initiator compositions.

8. A process according to claim 7 wherein the alkyllithium is sec-butyllithium, and the conjugated diene is 1,3-butadiene.

9. A process according to claim 7 wherein the alkyllithium is sec-butyllithium, and the vinyl-substituted aromatic compound is a member selected from the group consisting of styrene and methylstyrene.

10. A process according to claim 1 wherein the monomer is selected from the group of methylstyrene in which the methyl is ring-substituted, p-vinyltoluene and m-vinyltoluene, and wherein the alkyllithium is sec-butyllithium.

11. A process according to claim 10 wherein the activator is an aliphatic tertiary monoamine, said monoamine being present in the range of about 0.2 to 2 equivalents per equivalent of sec-butyllithium.

12. A process according to claim 11 wherein the tertiary monoamine is triethylamine.

13. A process for preparing di- and poly-functional polymerization initiator compositions which comprises forming a dilithio adduct by reacting about 2 moles of a $C_2$–$C_{12}$ alkyllithium with 1 mole of at least one polymerizable monomer selected from the group of $C_4$–$C_{12}$ conjugated dienes and vinyl-substituted aromatic compounds in a medium selected from at least one member of the group of aliphatic, cycloaliphatic, and aromatic hydrocarbons, and then chain-extending said resulting product with from 1 to 2 moles of at least one polymerizable monomer selected from the group of $C_4$–$C_{12}$ conjugated dienes and vinyl-substituted aromatic compounds to effect formation of di- or poly-functional polymerization initiator compositions, said reactions being carried out in the presence of a mono- or di-tertiary amine activator selected from the group consisting of low molecular weight aliphatic trialkylamines possessing no methyl groups, and arylalkyl tertiary amines in which the alkyl groups contain from 1 to 4 carbon atoms, said activators being employed in amounts in the range of about 0.01 to 10 equivalents per equivalent of alkyllithium.

14. A process according to claim 13 wherein the monomer is selected from the group of methylstyrene, p-vinyltoluene and m-vinyltoluene, and wherein the alkyllithium is sec-butyllithium.

15. A polymerization initiator composition comprising a di- or poly-functional polymerization initiator comprising the reaction product of (a) 1 to 2 moles of a $C_2$–$C_{12}$ alkyllithium with (b) a $C_4$–$C_{12}$ chain-extended monolithium adduct, said monolithium adduct resulting from reacting from 1 to 2 moles of at least one polymerizable monomer selected from the group $C_4$–$C_{12}$ conjugated dienes and vinyl-substituted aromatic compounds with 1 mole of a $C_2$–$C_{12}$ alkyllithium, said reaction of (a) and (b) being effected in the presence of a mono- or di-tertiary amine activator selected from the group consisting of low molecular weight aliphatic trialkylamines possessing no methyl groups, and arylalkyl tertiary amines in which the alkyl groups contain from 1 to 4 carbon atoms, said activators being employed in amounts in the range of about 0.01 to 10 equivalents per equivalent of alkyllithium, said monolithium adduct, prior to said chain-extension, being substantially free of polymers of said conjugated dienes and/or of said vinyl-substituted aromatic compounds.

16. The composition of claim 15 in which the alkyllithium is sec-butyllithium.

17. The composition of claim 15 in which the conjugated diene or vinyl-substituted aromatic compound is a member selected from the group of 1,3-butadiene, methylstyrene, p-vinyltoluene and m-vinyltoluene.

18. An initiator having the structural formula

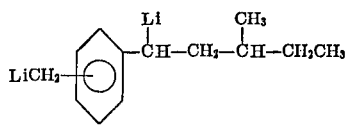

in which the $LiCH_2$— group is in a meta or para position to the other substituent on the aromatic ring.

19. An initiator having the structural formula

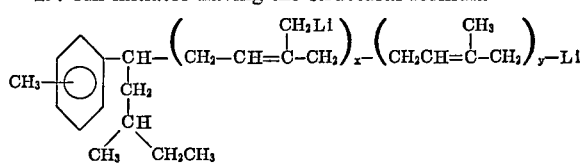

where $x$ and $y$ are integers from 1 to 6 and $x+y=6$; and where the $CH_3$ group is in a meta or para position to the other substituent on the aromatic ring.

20. An initiator having the structural formula

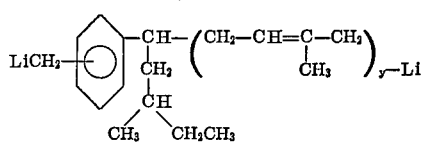

where $x$ is an integer from 1 to 6; and where the $LiCH_2$— group is in a meta or para position to the other substituent on the aromatic ring.

21. An initiator having the structural formula

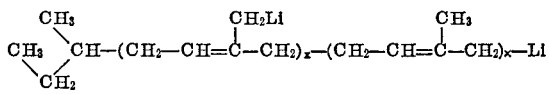

where $x$ and $y$ are integers from 1 to 6 and $x+y=6$.

22. A polymerization initiator composition comprising a di- or poly-functional polymerization initiator comprising the reaction product of an adduct of substantially 2 moles of a $C_2$–$C_{12}$ alkyllithium with 1 mole of a vinyl-substituted aromatic hydrocarbon monomer, said adduct being chain-extended with up to 6 moles of at least one polymerizable vinyl-substituted aromatic hydrocarbon monomer.

23. A polymerization initiator composition according to claim 22 in which the vinyl substituted aromatic hydrocarbon is a member selected from the group of methylstyrene in which the methyl is ring-substituted, p-vinyltoluene and m-vinyltoluene.

24. The polymerization initiator of claim 23 which has been metalated with from 1 to 2 moles of sec-butyllithium.

References Cited

UNITED STATES PATENTS

| | | | |
|---|---|---|---|
| 3,280,084 | 10/1966 | Zelinski et al. | 260—880 R |
| 3,001,840 | 1/1967 | Zelinski | 260—879 |
| 3,402,159 | 9/1968 | Hsieh | 260—85.1 |
| 3,492,369 | 1/1970 | Naylor | 260—879 |
| 3,640,899 | 2/1972 | Naylor | 260—94.2 M |
| 3,644,322 | 2/1972 | Farrar | 260—94.2 M |
| 3,652,516 | 3/1972 | Farrar | 260—83.7 |

OTHER REFERENCES

Naylor et al., Macromolecules, vol. 3, 1970, pp. 486–490.

DANIEL E. WYMAN, Primary Examiner

A. P. DEMERS, Assistant Examiner

U.S. Cl. X.R.

252—431 R; 260—94.2 M, 680 B